(12) United States Patent
Suzuki

(10) Patent No.: US 8,807,253 B2
(45) Date of Patent: Aug. 19, 2014

(54) IN-WHEEL MOTOR DRIVE DEVICE

(75) Inventor: Minoru Suzuki, Iwata (JP)

(73) Assignee: NTN Corporation, Osaka (JP)

( * ) Notice: Subject to any disclaimer, the term of this patent is extended or adjusted under 35 U.S.C. 154(b) by 144 days.

(21) Appl. No.: 13/513,707

(22) PCT Filed: Nov. 9, 2010

(86) PCT No.: PCT/JP2010/069941
§ 371 (c)(1),
(2), (4) Date: Jun. 4, 2012

(87) PCT Pub. No.: WO2011/070882
PCT Pub. Date: Jun. 16, 2011

(65) Prior Publication Data
US 2012/0241233 A1    Sep. 27, 2012

(30) Foreign Application Priority Data
Dec. 7, 2009    (JP) .................................. 2009-277703

(51) Int. Cl.
*B60K 1/00* (2006.01)
(52) U.S. Cl.
USPC ...................................................... 180/65.51
(58) Field of Classification Search
USPC ............ 180/65.51, 65.31, 65.6, 65.7, 65.21, 180/247, 197, 54.1; 301/6.5, 6.91, 137
See application file for complete search history.

(56) References Cited

U.S. PATENT DOCUMENTS 7,527,113 B2 *  5/2009  Jenkins ...................... 180/65.51

FOREIGN PATENT DOCUMENTS

| | | |
|---|---|---|
| JP | 04-80950 | 7/1992 |
| JP | 2888673 | 2/1999 |
| JP | 2002-061720 | 2/2002 |
| JP | 2004-293682 | 10/2004 |
| JP | 2007-237928 | 9/2007 |
| JP | 2009-041747 | 2/2009 |
| JP | 2009-052630 | 3/2009 |
| JP | 2009-063043 | 3/2009 |
| WO | 2005/030518 | 4/2005 |

* cited by examiner

*Primary Examiner* — John Walters
*Assistant Examiner* — James Triggs
(74) *Attorney, Agent, or Firm* — Clark & Brody

(57) ABSTRACT

An in-wheel motor drive device 21 includes: a motor portion A; a speed reduction portion B that reduces the speed of rotation of the motor portion A to output the rotation having the reduced speed to an output shaft 28; and a wheel hub 32 coupled to the output shaft 28. The speed reduction portion B has a cylindrical casing-side member 45 that extends from one axial end to the other axial end of the speed reduction portion and that has both one end and the other end formed integrally, the output shaft 28 that is inserted through an inner space region of the casing-side member, and two output-shaft bearings 38*a*, 38*b* that are respectively provided on an inner periphery at both ends 45*f* of the casing-side member to rotatably support the output shaft 28.

9 Claims, 2 Drawing Sheets

IN-WHEEL MOTOR DRIVE DEVICE

TECHNICAL FIELD

The present invention relates to a support structure of an output shaft of an in-wheel motor drive device.

BACKGROUND ART

A structure as described in Japanese Patent No. 2,888,673 (Patent Literature 1) is known as a conventional cycloidal speed reduction mechanism. The structure described in Patent Literature 1 is a cycloidal speed reduction mechanism, and can achieve a high reduction ratio as compared to planetary gear speed reduction mechanisms as typical conventional speed reducers. However, in such a conventional cycloidal speed reduction mechanism, a casing that rotatably supports an output shaft at one end in an axial direction, an internal gear that is placed in a central portion in the axial direction, and a casing that rotatably supports the output shaft at the other end in the axial direction are coupled and fixed together by bolts extending parallel to an axis. Thus, it is difficult to control assembly accuracy of the casings and the internal gear.

That is, the casings at both ends and the internal gear are assembled coaxially and in series so as to be aligned with respect to the axis. However, even slight displacement of the casings and the internal gear from the parallel arrangement after assembly is finished causes uneven wear of outer pins provided inside, thereby degrading durability performance.

For example, an in-wheel motor drive device as described in Japanese Unexamined Patent Application Publication No. 2009-52630 (Patent Literature 2) is known as an in-wheel motor drive device including a cycloidal speed reduction mechanism that has overcome this disadvantage. In the in-wheel motor drive device described in Patent Literature 2, a motor portion, a speed reduction portion that receives a driving force from the motor portion and reduces the speed of rotation to output the rotation having the reduced speed to the side of a wheel, and a wheel hub that is coupled to an output shaft of the speed reduction portion are arranged coaxially and in series. This in-wheel motor drive device is highly advantageous in that since the speed reduction portion is a cycloidal speed reduction mechanism, required torque for the drive motor can be reduced, and the size and weight of the in-wheel motor drive device can be reduced. Since a cylindrical outer-pin holding portion holds outer pins parallel to an axis, the outer pins are always held parallel, and uneven wear of the outer pins can be prevented.

CITATION LIST

Patent Literature

PTL 1: Japanese Patent No. 2,888,673
PTL 2: Japanese Unexamined Patent Application Publication No. 2009-52630

SUMMARY OF INVENTION

Technical Problem

However, the inventor found that there still remains room for improvement in such conventional in-wheel motor drive devices. That is, in the in-wheel motor drive device described in Patent Literature 2, the respective axes of the wheel hub located on the wheel side and a wheel-side rotation member of the speed reduction portion are normally aligned with the axis of the speed reduction portion. However, the wheel hub and the wheel-side rotation member are fixed together by press fitting, and are rotatably supported in a central portion in the axial direction by a wheel-hub bearing. Thus, the wheel-side rotation member is supported at one end in the speed reduction portion. In this case, a radial load and a bending moment load applied from the wheel hub to the wheel-side rotation member may cause internal deformation. For example, the axis of the wheel-side rotation member may be temporarily misaligned with respect to the central axis of the speed reduction portion, or one axial end of the wheel-side rotation member may be temporarily displaced with respect to the other axial end thereof. Thus, inner pins and curve plates inside the speed reduction portion may wear unevenly.

Moreover, speed reduction mechanisms used in vehicles are manufactured not only by putting together many parts having various dimensions, but also by combining different kinds of metal members having different linear expansion coefficients, such as a steel material for ensuring strength and an aluminum material for reducing the weight. It is therefore difficult to accurately control internal clearances, dimension errors, and geometric errors. Accordingly, coaxial arrangement, right-angle arrangement, and parallel arrangement of the parts may be out of an acceptable range, resulting in uneven wear in the speed reduction portion, increased noise and vibration, and a shorter life.

In view of the above problems, it is an object of the present invention to provide an in-wheel motor drive device capable of preventing uneven wear in a speed reduction portion and contributing to simplification of dimension error control during assembly.

Solution to Problem

In order to achieve this object, an in-wheel motor drive device according to the present invention includes: a motor portion; a speed reduction portion that reduces a speed of rotation of the motor portion to output the rotation having the reduced speed to an output shaft; and a wheel hub coupled to the output shaft, wherein the speed reduction portion has a cylindrical casing-side member that extends from one axial end to the other axial end of the speed reduction portion and that has both one end and the other end formed integrally, the output shaft that is inserted through an inner space region of the casing-side member, and two output-shaft bearings that are respectively provided on an inner periphery at both ends of the casing-side member to rotatably support the output shaft.

According to the present invention, since the speed reduction portion has the two output-shaft bearings that are provided on the inner periphery at both axial ends of the casing-side member to rotatably support the output shaft, the output shaft is supported at both ends. This allows the output shaft to be held coaxially with the speed reduction portion against a radial load and a bending moment load which are applied from the wheel hub, whereby internal deformation of the speed reduction portion can be suppressed, and uneven wear in the speed reduction portion can be prevented. Moreover, supporting the output shaft at both ends can simplify control of dimension errors and geometric errors.

The cylindrical casing-side member that extends from the one axial end to the other axial end of the speed reduction portion and that has both the one end and the other end formed integrally refers to a fixed member that is fixed to a casing on both one axial side and the other axial side as viewed from the center in an axial direction of the speed reduction portion.

Accordingly, the casing-side member may have the same axial dimension as the speed reduction portion and extend along the entire axial length of the speed reduction portion from the one end to the other end of the speed reduction portion, or may have a smaller axial dimension than the speed reduction portion.

The cylindrical casing-side member that has both the one end and the other end formed integrally does not include any member in which one end and the other end are formed as separate elements and are mechanically coupled together by a coupling member such as a bolt.

The speed reduction portion may be a commonly used planetary gear speed reduction mechanism or a cycloidal speed reduction mechanism. The output shaft of the speed reduction portion and the wheel hub may be coupled and fixed together so as not to be rotatable relative to each other in a radial direction. However, preferably, the wheel hub and the output shaft are coupled together so as not to be rotatable relative to each other while allowing respective central axes of the wheel hub and the output shaft to be misaligned with respect to each other. According to this embodiment, the central axis of the wheel hub is allowed to be misaligned with the central axis of the output shaft, a bending moment load is absorbed at the joint portion, and no bending moment load is applied from the wheel hub to the output shaft. Accordingly, internal deformation of the speed reduction portion can be prevented in a preferable manner. Specifically, the wheel hub and the output shaft are coupled together by a sliding constant-velocity joint. Alternatively, one of the wheel hub and the output shaft has a central hole extending along the axial direction, and the other of the wheel hub and the output shaft is inserted in the central hole, so that the wheel hub and the output shaft are coupled together with a radial gap therebetween so as not to be rotatable relative to each other. More specifically, a plurality of grooves and ridges are formed at regular intervals in a circumferential direction on an inner periphery of the central hole, and similar grooves and ridges are formed at regular intervals in the circumferential direction on an outer periphery of the other of the wheel hub and the output shaft, so that the wheel hub and the output shaft loosely fit together.

Coupling between the motor portion and the speed reduction portion is not particularly limited. An input shaft of the speed reduction portion which receives rotation from the motor portion may be rotatably supported by the casing. However, preferably, the output shaft has a central hole extending along the axial direction, and the speed reduction portion further has an input shaft that is drivingly coupled to the motor portion and received by the central hole of the output shaft, and two input-shaft bearings that are respectively provided on an inner periphery on one axial side and the other axial side of the central hole of the output shaft to rotatably support the input shaft at the both axial ends of the speed reduction portion. According to this embodiment, since the speed reduction portion further has the two input-shaft bearings that are respectively provided on the inner periphery on one axial side and the other axial side of the output shaft to rotatably support the input shaft at the both axial ends of the speed reduction portion, the input shaft is supported at both ends. This allows not only the output shaft but also the input shaft to be held coaxially with the speed reduction portion, whereby internal deformation of the speed reduction portion can further be suppressed, and uneven wear in the speed reduction portion can be prevented. Moreover, supporting the input shaft at both ends can simplify control of dimension errors and geometric errors.

The motor portion and the speed reduction portion may be coupled together by coupling and fixing the input shaft of the speed reduction portion to a motor rotation shaft of the motor portion so that the input shaft and the motor rotation shaft are not rotatable relative to each other in the radial direction. However, preferably, the motor portion has a motor rotation shaft that is attached and fixed to a rotor to output rotation drive of the motor portion to the input shaft. The motor rotation shaft and the input shaft are coupled together so as not to be rotatable relative to each other while allowing respective central axes of the motor rotation shaft and the input shaft to be misaligned with respect to each other. According to this embodiment, since the central axis of the motor rotation shaft is allowed to be misaligned with respect to the central axis of the input shaft, a bending moment load is absorbed at the joint portion, and no bending moment load is applied from the motor rotation shaft to the input shaft, or vice versa. Accordingly, internal deformation of both the motor portion and the speed reduction portion can be prevented in a preferable manner. Specifically, the motor rotation shaft and the input shaft are coupled together by a sliding constant-velocity joint. Alternatively, one of the motor rotation shaft and the input shaft has a central hole extending along the axial direction, and the other of the motor rotation shaft and the input shaft is inserted in the central hole, so that the motor rotation shaft and the input shaft are coupled together with a radial gap therebetween so as not to be rotatable relative to each other. More specifically, a plurality of grooves and ridges are formed at regular intervals in the circumferential direction on an inner periphery of the central hole, and similar grooves and ridges are formed at regular intervals in the circumferential direction on an outer periphery of the other of the motor rotation shaft and the input shaft, so that the motor rotation shaft and the input shaft loosely fit together.

Preferably, the speed reduction portion has a cycloidal speed reduction mechanism. Specifically, the speed reduction portion further has a disc-shaped eccentric member that is coupled to the input shaft so as to be eccentric with respect to a rotation axis of the input shaft, a revolution member that has an inner periphery attached to an outer periphery of the eccentric member so that the revolution member is rotatable relative to the eccentric member, and that makes revolution motion about the rotation axis according to rotation of the input shaft, an outer-periphery engagement member that engages with an outer peripheral portion of the revolution member to cause rotation motion of the revolution member, and an inner engagement member that is provided in the output shaft to output the rotation motion of the revolution member. The casing-side member supports the outer-periphery engagement member at the both ends. According to this embodiment, since the casing-side member supports the outer-periphery engagement member at both axial ends, the outer-periphery engagement member can be held parallel to an axis of the speed reduction portion. Accordingly, uneven wear in the speed reduction portion can be prevented.

More specifically, the inner engagement member is a pin extending parallel to an axis, and multiple ones of the pin are arranged at regular intervals in the circumferential direction in the output shaft. The output shaft includes an output-shaft main body placed on a side closer to the wheel hub, the pins protruding from the output-shaft main body, and a ring portion placed on a side farther from the wheel hub to couple tip ends of the pins together. One of the output-shaft bearings is provided between the inner periphery at the one axial end of the casing-side member and an outer periphery of the output-shaft main body, and the other output-shaft bearing is provided between the inner periphery at the other axial end of the casing-side member and an outer periphery of the ring portion. More preferably, one of the input-shaft bearings is provided between an inner periphery of the output-shaft main body and an outer periphery on one side of the input shaft, and the other input-shaft bearing is provided between an inner periphery of the ring portion and the outer periphery on the other side of the input shaft.

Advantageous Effects of Invention

As described above, the present invention has the cylindrical casing-side member that extends from the one axial end to the other axial end of the speed reduction portion and that has both one end and the other end formed integrally, and the both ends of the casing-side member rotatably support the output shaft. Thus, the output shaft can be supported at both ends, and can be held coaxially with the speed reduction portion. This can prevent the output shaft of the speed reduction portion from becoming non-parallel with the axis, against a radial load and a bending moment load which are applied from the wheel hub to the output shaft, and thus can prevent uneven wear in the speed reduction portion. As a result, durability performance of the in-wheel motor drive device is improved.

Moreover, the present invention has the output-shaft bearings and the input-shaft bearings at both axial ends of the speed reduction portion. This allows the components of the speed reduction portion, namely the casing-side member, the output shaft, the input shaft, and various rotating elements placed between the output shaft and the input shaft, to be produced as a unit. Thus, the speed reduction portion as a unit can be assembled on a separate assembly line from that of the in-wheel motor drive device, whereby assembly efficiency of the in-wheel motor drive device is improved.

DESCRIPTION OF EMBODIMENTS

An embodiment of the present invention will be described in detail below with reference to the accompanying drawings.

Figure 1:
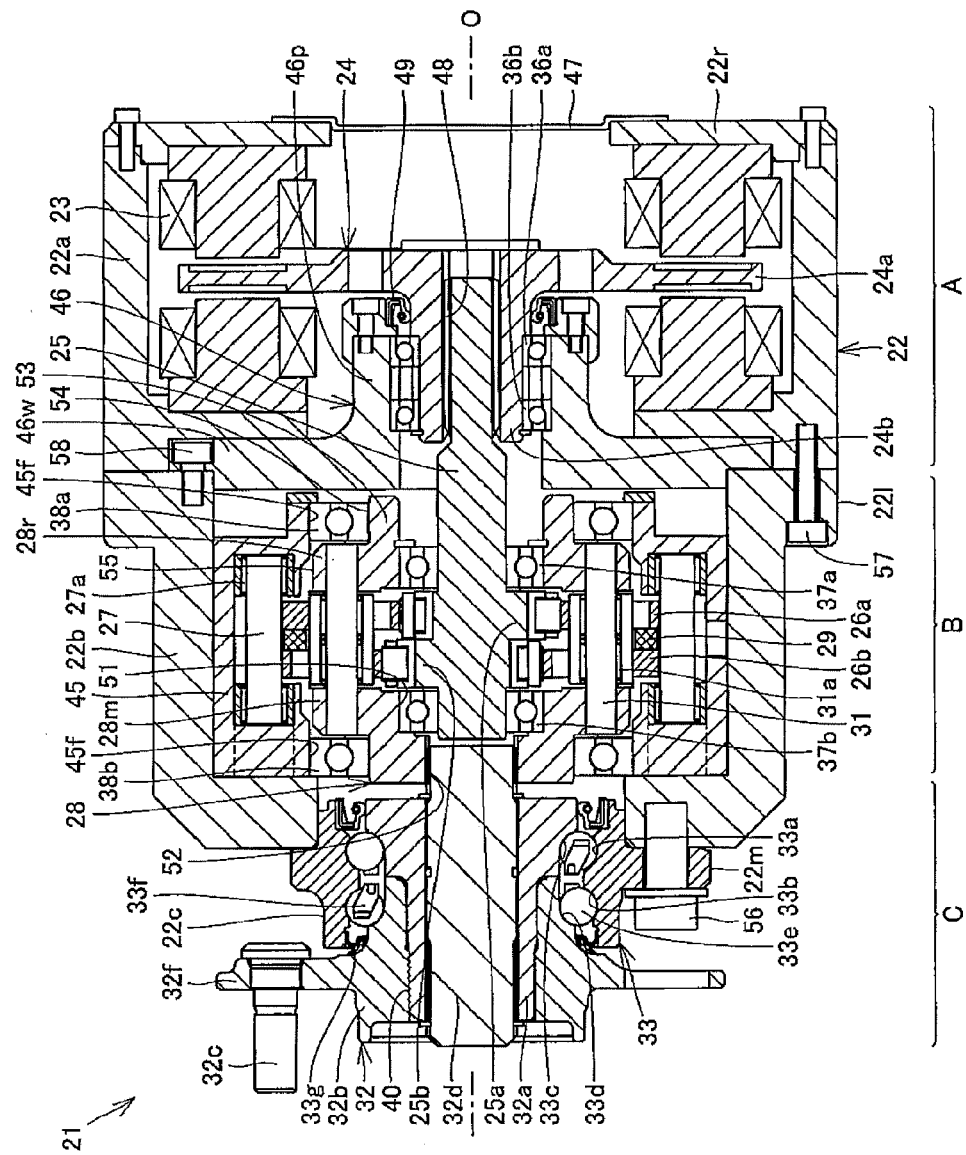
FIG. 1 is a longitudinal cross-sectional view showing an in-wheel motor drive device according to an embodiment of the present invention.
Figure 2:
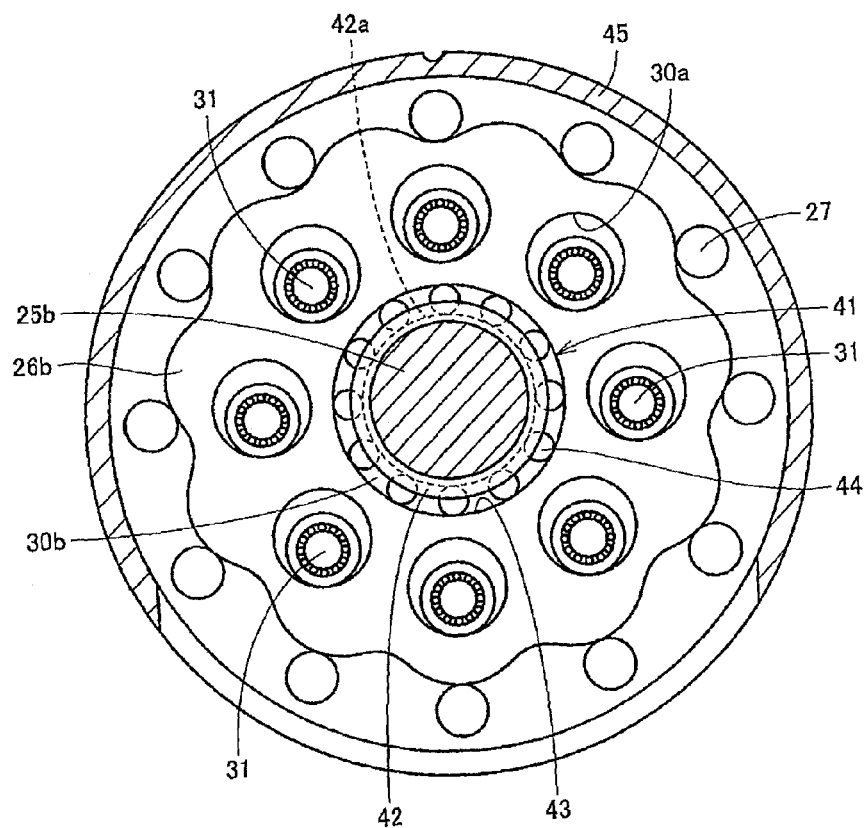
FIG. 2 is a transverse cross-sectional view showing a speed reduction portion in FIG. 1.

FIG. 1 is a longitudinal cross-sectional view showing an in-wheel motor drive device according to an embodiment of the present invention. FIG. 2 is a transverse cross-sectional view of a speed reduction portion in FIG. 1. An in-wheel motor drive device 21 includes a motor portion A as a motor drive device that generates a driving force, a speed reduction portion B that reduces the speed of rotation of the motor portion A to output the rotation having the reduced speed, and a wheel-hub bearing portion C that transmits the output of the speed reduction portion B to a driving wheel, not shown. The in-wheel motor drive device 21 is attached to a position inside a wheel housing of an electric car. The motor portion A, the speed reduction portion B, and the wheel-hub bearing portion C are sequentially arranged coaxially and in series in this order.

The motor portion A is an axial gap motor having a cylindrical motor-portion casing 22a forming an outer shell, a partition wall 46 separating the internal space of the motor portion A from the internal space of the speed reduction portion B, a rear cover 22r fixed to one of both ends of the motor-portion casing 22a which is located on the opposite side from the partition wall 46, a stator 23 fixed to the motor-portion casing 22a and the rear cover 22r, and a rotor 24 positioned to face the stator 23 with an axial gap interposed therebetween. A sealing member 47 is provided over a central hole of the rear cover 22r in order to prevent entry of dust into the motor portion A, etc.

The rotor 24 has a flange-shaped rotor portion 24a and a cylindrical hollow portion 24b. The hollow portion 24b extends along an axis O and has a through hole 48 in its center. The rotor portion 24a has a flange shape extending radially outward from an end of the hollow portion 24b, and both surfaces of the rotor portion 24a face the stator 23. An input shaft 25 extending from the speed reduction portion B is inserted through and fixed to the hollow portion 24b as a motor rotation shaft that is fixed to the rotor.

The partition wall 46 has a through hole in its center, and includes a disc-shaped partition-wall main body 46w, and a cylindrical portion 46p extending along the axis O from the center of the partition-wall main body 46w toward the motor portion A. The hollow portion 24b and the input shaft 25 extend through the through hole of the cylindrical portion 46p. The partition wall 46 rotatably supports the outer periphery of the hollow portion 24b via rolling bearings 36a, 36b at two positions on the inner periphery of the cylindrical portion 46b which are separated from each other in a direction of the axis O. A sealing member 49 is provided in an annular gap between the cylindrical portion 46p and the hollow portion 24b in order to prevent lubricant sealed in the speed reduction portion B from entering the motor portion A.

A plurality of grooves and ridges extending in the direction of the axis O are formed at regular intervals in a circumferential direction on the inner peripheral surface of the through hole 48. A plurality of similar grooves and ridges extending in the direction of the axis O are formed at regular intervals in the circumferential direction on the outer peripheral surface of an end of the input shaft 25 which is located on the side of the motor portion A. The input shaft 25 extending from the speed reduction portion B is inserted in and serration-fits in the through hole 48 of the hollow portion 24b, so that the input shaft 25 and the rotor 24 are coupled together so as not to be rotatable relative to each other. This serration fit is a loose fit with a radial gap therebetween, and allows the respective central axes to be misaligned with respect to each other to allow slight relative movement and bending in a radial direction. Thus, a bending moment load is absorbed by the radial gap, and no bending moment load is transmitted from the rotor 24 to the input shaft 25, or vice versa.

Although not shown in the figure, as a modification, a hole may be formed in the input shaft, and one end of a rotor rotation shaft may be inserted in the input shaft, so that the input shaft and the rotor rotation shaft are coupled together with a radial gap therebetween so as not to be rotatable relative to each other.

The input shaft 25 extends along the axis O, is placed to extend from the motor portion A to the speed reduction portion B in order to transmit the driving force of the motor portion A to the speed reduction portion B, and is supported by input-shaft bearings 37a, 37b at both ends of the speed reduction portion B. The two input-shaft bearings 37a, 37b are rolling bearings. Two eccentric portions 25a, 25b are formed on the outer periphery of the input shaft 25 between the input-shaft bearing 37a and the input-shaft bearing 37b. The eccentric portions 25a, 25b provided in the speed reduction portion B have a disc shape, but are provided so as to be eccentric with respect to the axis O. The two eccentric portions 25a, 25b are provided with a phase difference of 180° therebetween in order to allow respective vibrations produced by a centrifugal force due to eccentric motion to cancel out each other.

The speed reduction portion B includes the input shaft 25 that is drivingly coupled to the motor portion A, the eccentric portions 25a, 25b, an output shaft 28 that outputs rotation having a reduced speed, curve plates 26a, 26b as revolution members that are rotatably held by the eccentric portions 25a, 25b, a plurality of outer pins 27 as outer-periphery engagement members that engage with the outer peripheries of the curve plates 26a, 26b, a motion conversion mechanism that transmits rotation motion of the curve plates 26a, 26b to the output shaft 28, and an annular center collar 29 that is inserted between the curve plates 26a, 26b.

A speed-reduction-portion casing 22b forming an outer shell of the speed reduction portion B is a cylindrical member in which both ends and a central portion in the direction of the axis O are formed integrally. The speed-reduction-portion casing 22b has its one axial end coupled and fixed to an outer-race-side member 22c of the wheel-hub bearing portion C by a bolt 56, and has the other axial end coupled and fixed to the motor-portion casing 22a of the motor portion A by a bolt 57. The radial dimensions of the motor-portion casing 22a, the speed-reduction-portion casing 22b, and the outer-race-side member 22c are sequentially reduced in this order. Thus, a flange portion 22m is formed in the other axial end of the outer-race-side member 22c, and the bolt 56 extends through the flange portion 22m. A flange portion 22l is formed in the other axial end of the speed-reduction-portion casing 22b, and the bolt 57 extends through the flange portion 22l. An outer peripheral portion of the partition-wall main body 46w is coupled and fixed by a bolt 58 to the end of the speed-reduction-portion casing 22b which is located closer to the motor portion A. The casings 22a, 22b, the rear cover 22r, and the outer-race-side member 22c form a casing 22 of the in-wheel motor drive device 21.

An outer-pin holding member 45 described below is attached and fixed to the inner periphery of the speed-reduction-portion casing 22b. The outer-pin holding member 45 is a casing-side member that is a cylindrical member in which both ends and a central portion in the direction of the axis O are formed integrally. The outer-pin holding member 45 has inner flange portions 45f at both ends in the direction of the axis O. The flange portions 45f at both ends hold the outer pins 27 parallel to the axis O via a needle roller bearing 27a. The output shaft is coaxially inserted through an inner space region of the outer-pin holding member 45.

The output shaft 28 extends along the axis O, and includes an output-shaft main body 28m placed on the side closer to the wheel-hub bearing portion C, a plurality of inner pins 31 protruding from the output-shaft main body 28m and extending parallel to the axis O, and a ring portion 28r placed on the side farther from the wheel-hub bearing portion C to couple the tip ends of the plurality of inner pins 31 together. The output-shaft main body 28m has a central hole 51 extending along the axis O. The plurality of inner pins 31 are arranged at regular intervals in the circumferential direction in the output shaft 28. The central hole 51, the space surrounded by the plurality of inner pins 31, and a central hole of the ring portion 28r receive an end of the input shaft 25.

One of the input-shaft bearings described above, 37b, is provided in an annular space between the inner peripheral surface of the central hole 51 and the outer peripheral surface of the input shaft 25. The other input-shaft bearing 37a is provided in an annular space between the inner peripheral surface of the ring portion 28r and the outer peripheral surface of the input shaft 25. Thus, the input shaft 25 is rotatably supported by the output shaft 28 via the input-shaft bearings 37a, 37b at two positions separated from each other in the direction of the axis O at both ends of the speed reduction portion B.

A plurality of holes that fix the inner pins 31 are formed radially outside the central hole 51 in the output-shaft main body 28m at regular intervals along a circumference about the axis O. A central hole 52 extending along the axis O is formed on the side of the wheel-hub bearing portion C with respect to the central hole 51. The central hole 52 has a smaller diameter than the central hole 51. Similarly, the outer periphery of one end of the output-shaft main body 28m which forms the central hole 52 has a smaller diameter than the outer periphery of the other end of the output-shaft main body 28m which forms the central hole 52. Thus, the output-shaft main body 28m is formed to have a smaller diameter at the one end in the direction of the axis O and a larger diameter at the other end in the direction of the axis O.

A plurality of grooves and ridges extending in the direction of the axis O are formed at regular intervals in the circumferential direction on the inner peripheral surface of the central hole 52. A plurality of similar grooves and ridges extending in the direction of the axis O are formed at regular intervals in the circumferential direction on the outer peripheral surface of an end of a wheel hub 32 which is located on the side of the speed reduction portion B. The wheel hub 32 extending from the wheel-hub bearing portion C is inserted in and serration-fits in the central hole 52, so that the output shaft 28 and the wheel hub 32 are coupled together so as not to be rotatable relative to each other. This serration fit is a loose fit with a radial gap therebetween, and allows the respective central axes to be misaligned with respect to each other to allow slight relative movement and bending in the radial direction. Thus, a bending moment load is absorbed by the radial gap, and no bending moment load is transmitted from the wheel hub 32 to the output shaft 28.

Although not shown in the figure, as a modification, a hole may be formed in the wheel hub, and one end of the output shaft may be inserted in the wheel hub so that the output shaft and the wheel hub are coupled together with a radial gap therebetween so as not to be rotatable relative to each other.

The central hole 52 and the inner flange portion 45f at one end of the outer-pin holding member 45 are located at the same position in the direction of the axis O. One output-shaft bearing 38b is provided in an annular space between the outer periphery of the output-shaft main body 28m and the inner peripheral surface of the inner flange portion 45f, at the same axial position as the central hole 52 but radially outside the central hole 52.

A ring-shaped ridge 53 protruding toward the motor portion A is formed in an inner peripheral portion of the ring portion 28r of the output shaft 28. An outer periphery 54 of the ridge 53 has a smaller diameter than an outer periphery 55 located at the same position in the direction of the axis O as the input-shaft bearing 37a. Thus, the ring portion 28r has a larger diameter at its one end in the direction of the axis O and a smaller diameter at the other end in the direction of the axis O. The smaller-diameter outer periphery 54 of the output shaft 28 and the inner flange portion 45f at the other end of the outer-pin holding member 45 are located at the same position in the direction of the axis O. One output-shaft bearing 38a is provided in an annular space between the outer periphery 54 and the inner peripheral surface of the inner flange portion 45f.

In this manner, the outer-pin holding member 45 as the casing-side member rotatably supports the output shaft 28 via the two output-shaft bearings 38a, 38b provided on the inner periphery at both ends of the casing-side member.

Referring to FIG. 2, the curve plate 26b has, along its outer periphery, a plurality of waves formed by a trochoid curve such as an epitrochoid, and has a plurality of through holes 30a, 30b extending through the curve plate 26b from its one end face to the other end face. The plurality of through holes 30a are provided at regular intervals along a circumference about a rotation axis of the curve plate 26a to receive the inner pins 31 described below. The through hole 30b is provided in the center (the rotation axis) of the curve plate 26a, and serves as the inner periphery of the curve plate 26b. The curve plate 26b is attached to the outer periphery of the eccentric portion 25b so as to be rotatable relative to the eccentric portion 25b.

The curve plate 26b is supported by a rolling bearing 41 so as to be rotatable with respect to the eccentric portion 25b. The rolling bearing 41 is a cylindrical roller bearing including an inner-race member 42 that fits on the outer peripheral surface of the eccentric portion 25b and that has an inner raceway on its outer periphery, a plurality of rollers 44 that are placed between the inner raceway 42a and an outer raceway 43 as the inner peripheral surface of the through hole 30b in the curve plate 26b, and a retainer (not shown) that retains the intervals between adjoining one of the rollers 44. Alternatively, the rolling bearing 41 may be a deep groove ball bearing. The inner-race member 42 further has a pair of collar portions facing each other so that the inner raceway 42a of the inner-race member 42 on which the rollers 44 roll is interposed therebetween. The inner-race member 42 holds the rollers 44 between the pair of collar portions. The curve plate 26a is configured similarly.

The plurality of outer pins 27 that engage with the outer peripheries of the curve plates 26a, 26b are provided at regular intervals along a circumferential track about the axis O. When the curve plates 26a, 26b make revolution motion according to the movement of the eccentric portions 25a, 25b, the outer pins 27 engage with curved recesses on the outer peripheries of the curve plates 26a, 26b, causing rotation motion of the curve plates 26a, 26b.

The outer pins 27 arranged in the speed-reduction-portion casing 22b may be directly held by the speed-reduction-portion casing 22b, but are preferably held by the outer-pin holding portion 45 that is fitted in and fixed to an inner wall of the speed-reduction-portion casing 22b. More specifically, both axial ends of the outer pins 27 are rotatably supported by the needle roller bearing 27a attached to the outer-pin holding portion 45. Rotatably attaching the outer pins 27 to the outer-pin holding portion 45 in this manner can reduce contact resistance that is caused by engagement with the curve plates 26a, 26b.

In order to reduce the weight of the in-wheel motor drive device 21, the casings 22a, 22b are comprised of a light metal such as an aluminum alloy or a magnesium alloy. On the other hand, it is desirable that the outer-race-side member 22b that supports a radial load of the driving wheel be comprised of a steel material, and that the outer-pin holding portion 45 that is required to have high strength be comprised of carbon steel.

The motion conversion mechanism is formed by the plurality of through holes 30a provided in the curve plates 26a, 26b, and the plurality of inner pins 31 that are provided in a central portion of the output shaft 28 and respectively inserted through the through holes 30a. The inner pins 31 are provided at regular intervals on a circumferential track about the rotation axis O of the output shaft 28, and both axial ends of the inner pins 31 are fixed to the output-shaft main body 28m and the ring portion 28r, respectively. The inner pins 31 are also referred to as inner engagement members because the inner pins 31 engage with the curve plates 26a, 26b at positions radially inside the outer peripheral portions of the curve plates 26a, 26b, as shown in FIG. 2.

In order to reduce frictional resistance with the curve plates 26a, 26b, a needle roller bearing 31a is provided on central portions in the axial direction of the inner pins 31. On the other hand, the through holes 30a are respectively provided at positions corresponding to the plurality of inner pins 31, and the inner-diameter dimension of the through hole 30a is made larger than the outer-diameter dimension (which refers to the "maximum outer diameter including the needle roll bearing 31a"; the same applies to the following description) of the inner pin 31 by a predetermined amount.

Referring back to FIG. 1, the wheel-hub bearing portion C includes the wheel hub 32 that is coupled to the output shaft 28, a wheel-hub bearing 33 that rotatably holds the wheel hub 32, and the outer-race-side member 22c that forms an outer race of the wheel-hub bearing 33. The wheel hub 32 extends along the axis O, and has a cylindrical hollow portion 32a, an outer cylinder portion 32a that is attached and fixed to the outer periphery of the hollow portion 32a, and a shaft portion 32d that is inserted through and fixed to a central hole of the hollow portion. The shaft portion 32d extends along the axis O, and an end of the shaft portion 32d which is located on the side of the speed reduction portion B is coupled to the output shaft 28. The driving wheel, not shown, is fixed and coupled by a bolt 32c to a flange portion 32f formed on the outer periphery of the outer cylinder portion 32b.

The hollow portion 32a is fixed to the outer cylinder portion 32b by press fitting. The term "press fitting" herein refers to a method in which with the in-wheel motor drive device 21 being fixed, a press-fitting jig (not shown) having an outer diameter slightly larger than the inner diameter of the hollow portion 32a is press-fitted in the central hole of the hollow portion 32a to plastically join the hollow portion 32a with the outer cylinder portion 32b by a plastic joint portion 40. Fixing and coupling the hollow portion 32a to the outer cylinder portion 32b by this method can significantly increase joint strength as compared to the case where the hollow portion 32a is fixed to the outer cylinder portion 32b by fitting. Thus, the flange portion 32f can be held stably.

The wheel-hub bearing 33 is a multi-row angular contact ball bearing using balls 33e as rolling elements. As outer raceways of the balls 33e, a first outer raceway 33a (on the right side in the figure) is provided on the side closer to the speed reduction portion B on the inner peripheral surface of the outer-race-side member 22c, and a second outer raceway 33b (on the left side in the figure) is provided on the side farther from the speed reduction portion B on the inner peripheral surface of the outer-race-side member 22c. As inner raceways of the balls 33e, a first inner raceway 33c facing the first outer raceway 33a is provided on the outer peripheral surface of the hollow portion 32a, and a second inner raceway 33d facing the second outer raceway 33b is provided on the outer peripheral surface of the outer cylinder portion 32b. The plurality of balls 33e are placed both between the first outer raceway 33a and the first inner raceway 33c and between the second outer raceway 33b and the second inner raceway 33d. The wheel-hub bearing 33 includes a retainer 33f that retains the balls 33e of the right and left rows in the direction of the axis O, and a sealing member 33g that prevents leakage of lubricant such as grease sealed inside the bearing, and entry of dust from the outside.

The operational principles of the in-wheel motor drive device 21 having the above configuration will be described in detail below.

The motor portion A receives, e.g., an electromagnetic force generated when an AC current is supplied to the stator 23, and rotates the rotor 24 including a magnetic element or a permanent magnet. Thus, the input shaft 25 as a speed-reduction-portion input shaft rotates together with the rotor 24, and the eccentric portions 25a, 25b coupled to the input shaft 25 make eccentric motion about the axis O.

Thus, the curve plates 26a, 26b make revolution motion about the axis O. At this time, the outer pins 27 engage with the curved recesses formed in the outer peripheries of the curve plates 26a, 26b, while being in rolling contact with the curved recesses. This causes the curve plates 26a, 26b to make rotation motion in an opposite direction from the rotation direction of the input shaft 25.

The inner pins 31 inserted through the through holes 30a have an outer diameter sufficiently smaller than the inner diameter of the through holes 30a, and respectively contact the inner peripheral surfaces of the through holes 30a according to the rotation motion of the curve plates 26a, 26b. Thus, the revolution motion of the curve plates 26a, 26b is not transmitted to the inner pins 31, and only the rotation motion of the curve plates 26a, 26a is transmitted to the wheel hub 32 via the output shaft 28.

At this time, the output shaft 28 placed coaxially with the axis O as a speed-reduction-portion output shaft outputs the rotation motion of the curve plates 26a, 26a. The reduction ratio of the speed reduction portion B is calculated by $(Z_A-Z_B)/Z_B$, where $Z_A$ represents the number of outer pins 27, and $Z_B$ represents the number of waves of the curve plates 26a, 26b. In the embodiment shown in FIG. 2, since $Z_A=12$ and $Z_B=11$, the reduction ratio is 1/11. Thus, a very high reduction ratio can be obtained. Accordingly, since the rotation of the input shaft 25 is transmitted to the output shaft B after being reduced in speed by the speed reduction portion B, required torque can be transmitted to the driving wheel even if a low-torque, high-rotation motor portion A is employed.

Thus, the use of the speed reduction portion B capable of obtaining a high reduction ratio without having a multistage configuration allows the compact, high reduction-ratio in-wheel motor drive device 21 to be obtained. Moreover, since the outer pins 27 are rotatable with respect to the outer-pin holding portion 45, and the needle roller bearing 31a is provided at a position where the inner pins 31 contact the curve plates 26a, 26b, the frictional resistance is reduced, whereby transmission efficiency of the speed reduction portion B is improved.

According to the present embodiment, the two output-shaft bearings 38a, 38b, which rotatably support the output shaft 28, are provided on the inner periphery at both ends of the cylindrical outer-pin holding member 45 having both ends in the direction of the axis O molded integrally. This allows the output shaft 28 to be supported at both ends, and allows the output shaft 28 to be held coaxially with the speed reduction portion B against the radial load and the bending moment load which are applied from the wheel hub 32 to the speed reduction portion B. This can suppress internal deformation of the speed reduction portion B, and can prevent uneven wear of the inner pins 31, the curve plates 26a, 26b, and the outer pins 27.

According to the present embodiment, the two input-shaft bearings 37a, 37b, which rotatably support the input shaft 25 at both ends in the direction of the axis O of the speed reduction portion B, are further respectively provided on the inner periphery of the output-shaft main body 28m located on one side in the direction of the axis O, and on the inner periphery of the ring portion 28r located on the other side in the direction of the axis O. This allows the input shaft 25 to be supported at both ends, and allows the input shaft 25 to be held coaxially with the speed reduction portion B, in addition to the output shaft 28. This can further suppress internal deformation of the speed reduction portion B, and can prevent uneven wear of the curve plates 26a, 26b and the rolling bearing 41.

According to the present embodiment, the output-shaft main body 28m has a smaller diameter at its one end in the direction of the axis O, and has a larger diameter at the other end in the direction of the axis O. The ring portion 28r of the output shaft 28 has a larger diameter at its one end in the direction of the axis O, and has a smaller diameter at the other end in the direction of the axis O. This allows the output-shaft bearings 38a, 38b and the inner pins 31 to be placed at the same radial position, and allows the input-shaft bearings 37a, 37b to be placed at the same axial positions as, and radially inside, both ends of the inner pins 31. As a result, the speed reduction portion B has preferable layout arrangement of the parts, whereby reduction in size of the speed reduction portion B can be implemented.

According to the present embodiment, the output-shaft bearings 38a, 38b are provided on the inner periphery at both ends of the outer-pin holding member 45 to rotatably support the output shaft 28, the input-shaft bearings 37a, 37b are provided on the inner periphery at both ends of the output shaft 38 to rotatably support the input shaft 25, and the curve plates 26a, 26b are provided between the input-shaft bearings 37a, 37b. This allows the speed reduction portion B to be produced as a unit. Thus, the speed reduction portion B as a unit can be assembled on a separate assembly line from that of the in-wheel motor drive device 21, whereby assembly efficiency of the in-wheel motor drive device 21 is improved.

Although the embodiment of the present invention is described above with reference to the drawings, the present invention is not limited to the illustrated embodiment. Various modifications and variations can be made to the illustrated embodiment within a scope that is the same as, or equivalent to that of the present invention.

INDUSTRIAL APPLICABILITY

The in-wheel motor drive device according to the present invention is advantageously used in electric cars and hybrid vehicles.

REFERENCE SIGNS LIST 21 in-wheel motor drive device
22 casing
22a motor-portion casing
22b speed-reduction-portion casing
22c outer-race-side member
22r rear cover
23 stator
24 rotor
24b hollow portion
25 input shaft
25a, 25b eccentric portion
26a, 26b curve plate
27 outer pin
28 output shaft
28m output-shaft main body
28r ring portion
29 center collar
31 inner pin
32 wheel hub
33 wheel-hub bearing
37a, 37b input-shaft bearing 38a, 38b output-shaft bearing
41 rolling bearing
45 outer-pin holding member (casing-side member)
46 partition wall

The invention claimed is:

1. An in-wheel motor drive device, comprising: a motor portion; a speed reduction portion that reduces a speed of rotation of said motor portion to output said rotation having said reduced speed to an output shaft; and a wheel hub coupled to said output shaft, wherein
said speed reduction portion has a cylindrical casing-side member that extends from one axial end to the other axial end of said speed reduction portion and that has both one end and the other end formed integrally, said output shaft that is inserted through an inner space region of said casing-side member, and two output-shaft bearings that are respectively provided on an inner periphery at both ends of said casing-side member to rotatably support said output shaft.

2. The in-wheel motor drive device according to claim 1, wherein
said wheel hub and said output shaft are coupled together so as not to be rotatable relative to each other while allowing respective central axes of said wheel hub and said output shaft to be misaligned with respect to each other.

3. The in-wheel motor drive device according to claim 2, wherein
one of said wheel hub and said output shaft has a central hole extending along an axial direction, and the other of said wheel hub and said output shaft is inserted in said central hole, so that said wheel hub and said output shaft are coupled together with a radial gap therebetween so as not to be rotatable relative to each other.

4. The in-wheel motor drive device according to claim 1, wherein
said output shaft has a central hole extending along an axial direction, and
said speed reduction portion further has an input shaft that is drivingly coupled to said motor portion and received by said central hole of said output shaft, and two input-shaft bearings that are respectively provided on an inner periphery on one axial side and the other axial side of said central hole of said output shaft to rotatably support said input shaft at said both axial ends of said speed reduction portion.

5. The in-wheel motor drive device according to claim 4, wherein
said motor portion has a motor rotation shaft that is attached and fixed to a rotor to output rotation drive of said motor portion to said input shaft, and
said motor rotation shaft and said input shaft are coupled together so as not to be rotatable relative to each other while allowing respective central axes of said motor rotation shaft and said input shaft to be misaligned with respect to each other.

6. The in-wheel motor drive device according to claim 5, wherein
one of said motor rotation shaft and said input shaft has a central hole extending along said axial direction, and the other of said motor rotation shaft and said input shaft is inserted in said central hole, so that said motor rotation shaft and said input shaft are coupled together with a radial gap therebetween so as not to be rotatable relative to each other.

7. The in-wheel motor drive device according to claim 4, wherein
said speed reduction portion further has a disc-shaped eccentric member that is coupled to said input shaft so as to be eccentric with respect to a rotation axis of said input shaft, a revolution member that has an inner periphery attached to an outer periphery of said eccentric member so that said revolution member is rotatable relative to said eccentric member, and that makes revolution motion about said rotation axis according to rotation of said input shaft, an outer-periphery engagement member that engages with an outer peripheral portion of said revolution member to cause rotation motion of said revolution member, and an inner engagement member that is provided in said output shaft to output said rotation motion of said revolution member, and
said casing-side member supports said outer-periphery engagement member at said both ends.

8. The in-wheel motor drive device according to claim 7, wherein
said inner engagement member is a pin extending parallel to an axis, and multiple ones of said pin are arranged at regular intervals in a circumferential direction in said output shaft,
said output shaft includes an output-shaft main body placed on a side closer to said wheel hub, said pins protruding from said output-shaft main body, and a ring portion placed on a side farther from said wheel hub to couple tip ends of said pins together,
one of said output-shaft bearings is provided between said inner periphery at said one axial end of said casing-side member and an outer periphery of said output-shaft main body, and
the other output-shaft bearing is provided between said inner periphery at the other axial end of said casing-side member and an outer periphery of said ring portion.

9. The in-wheel motor drive device according to claim 8, wherein
one of said input-shaft bearings is provided between an inner periphery of said output-shaft main body and an outer periphery on one side of said input shaft, and
the other input-shaft bearing is provided between an inner periphery of said ring portion and said outer periphery on the other side of said input shaft.

* * * * *